J. HAPTONSTALL & F. B. PRESTON.
Churn.

No. 197,777. Patented Dec. 4, 1877.

Witnesses:
P. C. Kenyon,
Jas. M. McCaughan.

Inventors:
John Haptonstall,
Francis B. Preston,
By Thomas G. Orwig,
Attorney.

UNITED STATES PATENT OFFICE.

JOHN HAPTONSTALL AND FRANCIS B. PRESTON, OF ADEL, IOWA, ASSIGNORS OF ONE-THIRD THEIR RIGHT TO JAMES A. GILKISON, OF SAME PLACE.

IMPROVEMENT IN CHURNS.

Specification forming part of Letters Patent No. 197,777, dated December 4, 1877; application filed September 10, 1877.

*To all whom it may concern:*

Be it known that we, JOHN HAPTONSTALL and FRANCIS B. PRESTON, of Adel, in the county of Dallas and State of Iowa, have invented an Improved Churn, of which the following is a specification:

The object of our invention is to economize time and labor in making butter by utilizing opposing forces, centrifugal and centripetal, to churn cream.

It consists in an upright portable churn-vessel, having a series of radial upright breakers fixed on its inside, and a rotary dasher composed of a perforated and slotted disk, having a series of fixed radial beaters projecting vertically from its upper side, being formed and co-operated as hereinafter fully set forth.

Figure 1:
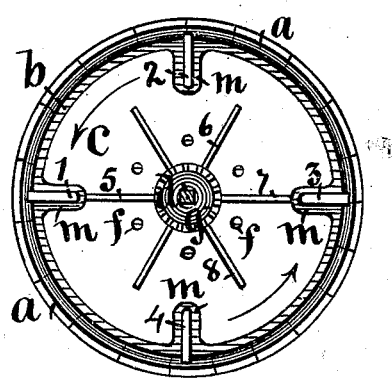
Figure 2:
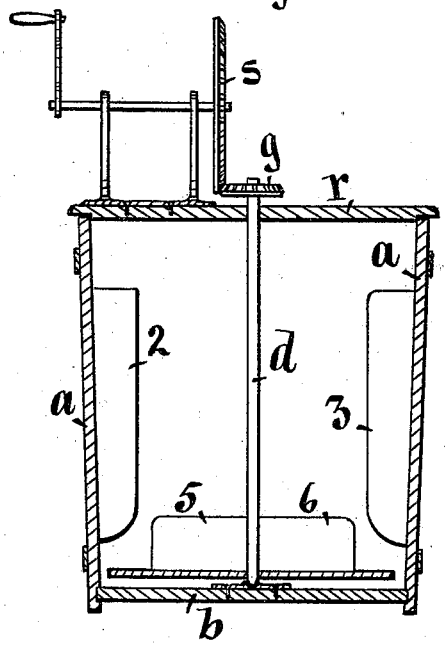

Figure 1 of the drawings is a top-plan view of our invention. Fig. 2 is a central elevation. Together they fully illustrate the construction and operation of our complete churn.

*a a* represent the cylindrical wall of a churn-vessel. It is preferably made of wood, and slightly flaring—wider at its top than at the bottom. It may vary in size, as desired.

*b* is the bottom of the vessel. 1 2 3 4 represent a series of breakers, fixed against the inside of the vessel by means of screws passed through from the outside, or in any suitable way. They stand inward toward the center, and extend from near the top to the lower portion of the vessel.

*c* represents a disk fixed to the lower end of the vertical and rotating shaft *d*, which rests in a pivotal step formed in or attached to the center of the bottom *b* of the vessel. *g* is a pinion fixed to the top end of the shaft *d*.

5 6 7 8 represent a series of beaters fixed on the top side of the disk *c*. They extend radially from the central shaft *d* toward the circumference of the disk *c*, but not far enough to come into contact with the upright stationary beaters 1 2 3 4 fixed against the inside of the wall *a a* of the churn-vessel when the dasher is rotated.

*f f* represent a series of perforations in the disk *c*, to allow the cream and milk to pass through. *m m* represent a series of slots formed in the outer edge of the disk *c*. They correspond in number and positions with the series of breakers 1 2 3 4 fixed against the wall *a a* of the churn-vessel, and allow the disk *c* and complete dasher to be lifted in and out of the vessel.

*r* represents a movable cover on top of the vessel. It may be formed in sections, hinged together, and secured to the vessel by means of hasps, or in any suitable way.

*s* represents a driving-wheel, which has its bearings fixed to the movable cover *r*. When the cover is properly adjusted the wheel *s* will engage the pinion *g* to actuate the dasher *d c*. It may be operated by hand by means of a crank-handle, or by power transmitted from any suitable motor by means of belts or gearing.

In the practical operation of our invention, when the cream is placed in the churn-vessel the dasher can be readily put into its place in the bottom of the vessel by turning the disk *c* so as to make its slots *m* register with the fixed breakers 1 2 3 4, to allow the disk to pass to its place in the bottom of the vessel. When the dasher is thus properly placed, the cover *r*, carrying the driving-wheel *s*, is put on top of the vessel, and the churn is ready for operation. The power applied to the driving-wheel is imparted to the dasher by means of the pinion *g*, to rotate the disk *c* and its beaters 5 6 7 8, which are immersed in the cream. This action will cause the dasher to agitate the cream, and, by centrifugal force, throw it violently and continuously from the center to the circumference, and against the breakers 1 2 3 4 fixed to the vessel. The breakers suddenly check the centrifugal force of the cream, and prevent it from rising and revolving against the inside of the vessel, and thereby produce a centripetal force that returns the cream continuously from the circumference to the center. By means of the opposing forces—centrifugal and centripetal—thus produced, the cream is kept in circulation and rapidly churned to produce butter, and when the butter is formed it will lodge on the perforated disk *c*, so that it can be readily lifted with the dasher and drained from the buttermilk, the disk serving the same as a colander.

We are aware that breakers on the inside of the wall of a churn-vessel have extended from the bottom upward, and were enlarged at their top portions to extend over a dasher placed in the churn; but we claim that our manner of fixing breakers at an elevated position relative to the bottom of the churn, and forming slots in the disk of a dasher to admit it to pass over the breakers and rotate underneath them, close to the bottom and the wall of the churn-vessel, and to prevent butter from remaining in the churn when the dasher is lifted to drain the buttermilk from the butter, is a novel and valuable improvement.

We claim as our invention—

1. The churn-vessel $a\, a\, b$, having a series of fixed or stationary breakers, 1 2 3 4, on its inside when said breakers are elevated from the bottom, and thereby adapted to admit a disk-form dasher to rotate underneath the breakers, in the manner and for the purposes set forth.

2. In a rotary dasher, the disk $c$, having a series of slots or openings, $m$, in its circumference, in combination with a churn-vessel having a corresponding series of fixed breakers, 1 2 3 4, substantially as and for the purposes shown and described.

JOHN HAPTONSTALL.
FRANCIS B. PRESTON.

Witnesses:
GEO. W. WELCH,
GEO. HOEYE.